May 5, 1953 A. PLEYDELL ET AL 2,637,255
PHOTOGRAPHIC CONTACT FRAME
Filed June 28, 1950
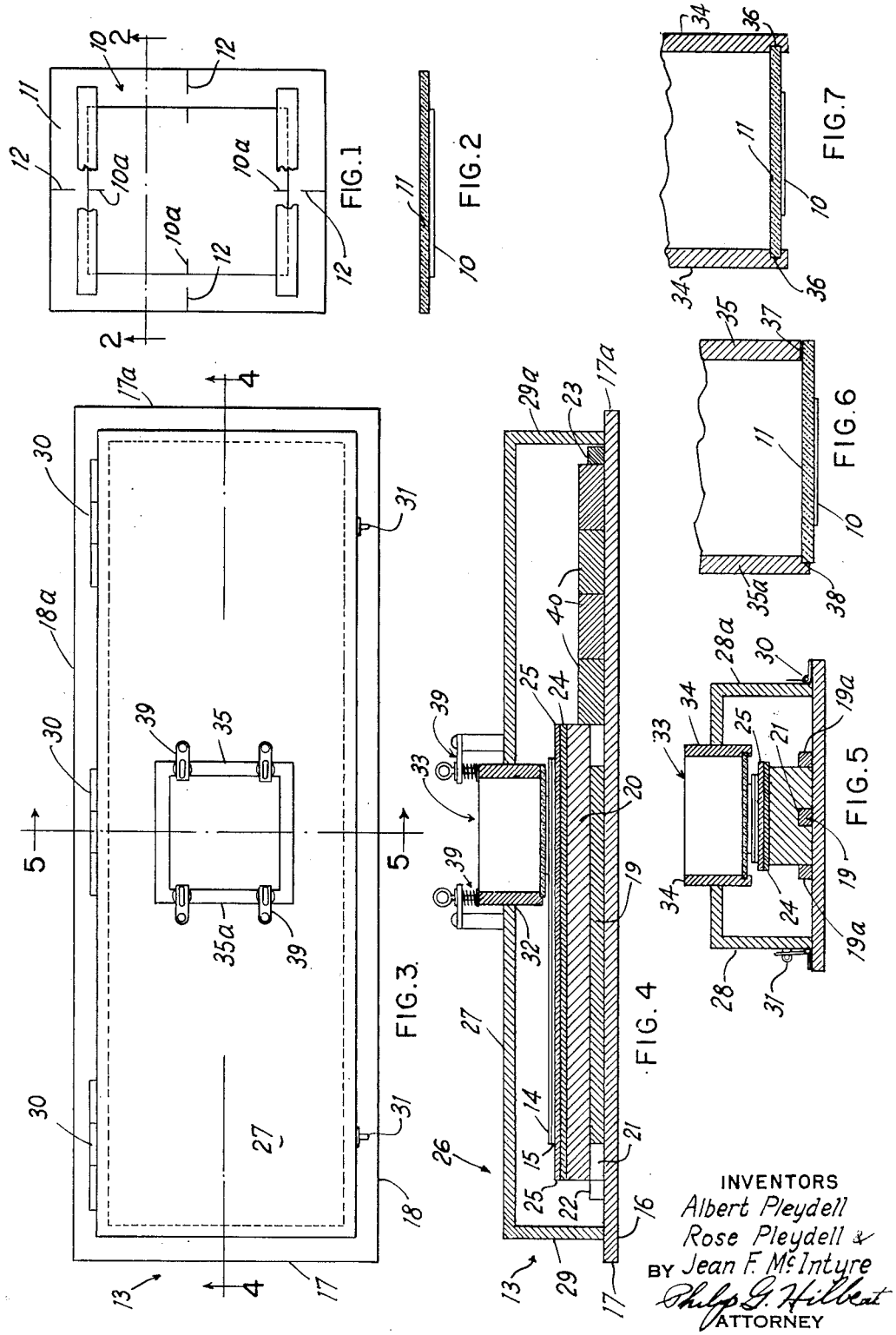
INVENTORS
Albert Pleydell
Rose Pleydell &
BY Jean F. McIntyre
Philip G. Hilbert
ATTORNEY Patented May 5, 1953

2,637,255

UNITED STATES PATENT OFFICE 2,637,255

PHOTOGRAPHIC CONTACT FRAME

Albert Pleydell and Rose Pleydell, Bellerose, and Jean F. McIntyre, Flushing, N. Y., assignors to Flambard, Inc., New York, N. Y., a corporation of New York Application June 28, 1950, Serial No. 170,852

3 Claims. (Cl. 95—77)

This invention relates to a method and means for exposing photographic film. More particularly, the invention concerns the exposure of sheet film to form multiple design photographic stencils of the type used in the silk screen process.

In the silk screen process, it is desirable in the interest of economy, to print simultaneously as many repeats of a single design, as possible. In addition, when each design is made up of a plurality of colors, steps must be taken to insure accurate registration of the several colors in each design in the multiple set up.

Multiple set ups of the type described may be attained in plants having extensive camera and other photographic equipment necessary to make full color pictures, color separations and the like, in accordance with procedures known in the art. Such techniques are necessarily expensive and are not very practical in the smaller plants.

Alternative procedures which have been used involve hand cutting separate film stencils for each single design and for the separate colors. This entails large amounts of labor and the end results are far from uniform. Also, special photographic procedures with single design masters have been used, but hereto substantial amounts of labor and time are expended without assurance of accurate color registration.

Accordingly, an object of this invention is to provide improved method and means for exposing sensitized photographic film, to form a plurality of stencil designs, wherein each design is accurately located relative to the other designs on the surface of the film, other films being similarly exposed to form a plurality of design stencils thereon, whereby each design on one film may be accurately correlated with a corresponding design on another film in the course of printing operations using such films as multicolor stencils, thus attaining precise color registration in each of the final prints.

Another object of this invention is to utilize commercial sensitized film which is prone to stretch and to distort in handling, to form multiple design photographic type stencils, wherein the film is exposed through a master, relative movement between the film and the master is provided to repeat the exposure on other portions of the film, while maintaining the film against stretch or distortion.

A further object of this invention is to provide an improved contact frame wherein a film support is movably mounted in the frame to permit consecutive exposure of selected areas of film positioned on the support, through a master mounted in the cover of the frame, and including means for accurately adjusting the position of the support for each exposure.

Still another object of this invention is to provide an improved contact frame including a base, a film support mounted on the base and a cover for enclosing the support, the cover being formed with an opening in which is movably mounted a master holder, together with means for resiliently urging the master holder towards sensitized film secured to the film support whereby uniform surface contact between the film and the master is attained while the film is being exposed through the master.

Still a further object of this invention is to provide an improved method and means for forming multiple design photographic film type stencils in a quick and economic manner, by the use of simple apparatus and standard accessory equipment, the final product making possible the simultaneous printing of multiple designs in multicolors wherein there is achieved excellent color registration in each of the individual designs.

Other objects of this invention will in part be obvious and in part hereinafter pointed out.

The invention accordingly consists in the combination of elements and arrangement of parts of a device, together with procedures, hereinafter described, and of which the scope of invention will be indicated in the following claims.

In the accompanying drawing, in which is shown illustrative embodiments of the invention;

Fig. 1 is a top plan view of a mounted master;

Fig. 2 is a sectional view taken on the line 2—2 of Fig. 1;

Fig. 3 is a top plan view of a contact frame embodying the invention;

Fig. 4 is a sectional view taken on the line 4—4 of Fig. 3;

Fig. 5 is a sectional view taken on the line 5—5 of Fig. 3;

Fig. 6 is a partial, longitudinal sectional view of the mounted master holder; and Fig. 7 is a partial, transverse sectional view thereof.

The invention involves the use of one or more masters or negatives 10, as shown in Fig. 1. Such master may take the form of a transparent sheet of cellulose acetate or other suitable material, bearing on one surface thereof an ink rendering of the original which is to be reproduced in a printing process. It is understood that for multicolor work, a separate master is prepared for each color. Master 10 may also take the form of a photonegative or any other element bearing light transmitting and light obstructing portions arranged to form the desired design.

The master 10 is mounted on a transparent sheet of glass 11, being properly located thereon by means of gauge marks 12 on the glass which are adapted to register with gauge marks 10a on the master. The master 10 is removably secured to glass 11 by means of tape or the like.

The mounted master is adapted to be used in conjunction with a contact frame generally designated as 13, to form a multiple stencil of the photographic film type, for use in the silk screen printing process. To this end there is provided sheet film 14 bearing on one surface a sensitizable gelatin coating 15. Such film is conventionally made of plastic materials such as cellulose acetate, polystyrene, or the like and has a tendency to stretch or otherwise become distorted when subjected to the slightest strains. Such films are made light sensitive by treating the gelatin coating with a bichromate solution, when the film is ready to be exposed.

The film comes in extended lengths and is cut to desired dimensions. In accordance with the present invention, the film is cut to a size which will be readily accommodated on the silk screen and is adapted to have formed on the surface thereof a plurality of individual stencils derived from a single master. It is understood that for multicolor work, a separate sheet of film is prepared for each master representing a single color. With repeating stencil designs on each sheet, it is necessary that each design be accurately located on its sheet and corresponding designs be precisely located on the several sheets in order to insure perfect registration of colors in each of the finally printed designs formed in multiple in a single printing operation.

The stencils are formed by exposing the sheet film 14 successively through the master 10 which is mounted for that purpose in contact frame 13. The frame 13 comprises an elongated base 16 having transverse edges 17, 17a and longitudinal edges 18, 18a. A bar track member 19 is secured longitudinally of the upper surface of base 16 and a guide member 19a is located on the base on either side of member 19 and parallel thereto, for the purpose hereinafter appearing.

Means for supporting sheet film 14 is provided and comprises a block 20 formed on its under surface with a longitudinal groove 21 for receiving track 19, the guide members 19a engaging the lower edge portions on opposite sides of the block to provide longitudinal slidable movement of the block relative to the track. Abutment or stop members 22, 23 are fixed to the opposite ends of the base adjacent edges 17, 17a, respectively, for the purpose hereinafter appearing.

An elongated, flat film support 24 is fixed to the upper surface of the block 21 and is covered on its upper surface with a sheet of resilient material 25, such as rubber or the like.

The frame 13 further comprises an inverted, box shaped cover 26 for enclosing the support 24. The cover 26 comprises a top wall 27 and depending side walls 28, 28a and end walls 29, 29a. Hinges 30 interconnect the lower edge of cover wall 28a and base edge 18a while interengageable catch members 31 on the lower edge of cover wall 28 and base edge 18 provide means for locking the cover to the base in its closed position.

The cover wall 27 is formed with a rectangular opening 32 located so as to be disposed opposite the support 24, in the closed position of the cover. The opening 32 is somewhat larger in its transverse dimension than the transverse dimension of support 24. Means is provided for movably mounting the master 10 in the opening 32 of the cover. To this end, there is provided an open, rectangular shaped, walled frame 33 slidably positioned in the cover opening. The frame 33 comprises parallel longitudinally extending walls 34 and parallel transversely extending walls 35, 35a. As shown in Fig. 5, the walls 34 are located on either side of film support 24 and are grooved at their lower ends as at 36 to slidably receive the longitudinal edges of glass 11. The transverse wall 35 is cut out at its lower end as at 37, to receive the glass 11 as it is moved in grooves 36, while wall 35a is rabbeted out as at 38 to form a stop for the leading edge of glass 11. Suitable means may be provided to retain glass 11 within frame 33, in a set position.

It will be noted, that the frame may be mounted in the cover opening 32 so that the glass 11 may be urged into intimate contact with the film support 24. Spring pressed clamps 39 are provided on cover wall 27 for engaging the upper edges of frame walls 35, 35a to press the frame 33 downwardly.

In practicing the instant invention, the sheet film 14 is sensitized by applying bichromate solution to the gelatin coating 15, in the usual manner. The sensitized sheet is removably secured with its gelatin coating down, on the film support 24, as by adhesive tape or the like, applied to the edges thereof. With the film 14 thus secured in place there is no likelihood of stretching or otherwise distorting the film while the same is being processed.

The mounted master 10 is slid into frame 33, which in turn is positioned in the cover opening 32. The block 20 may be moved on track 19 until it engages stop 22, thus positioning the supported film with a predetermined surface area thereof opposite the mounted master when the cover is swung into its closed position, as shown in Fig. 4. The cover is locked by means of catches 31 and the clamps 39 are arranged to engage the upper edges of walls 35, 35a, thus pressing the master 10 into intimate contact with the film 14. The film area defined by the frame 33 is exposed through the master to the influence of a source of light, not shown, which is positioned over the frame opening for a predetermined time interval.

After exposure of the first film area, other film areas are similarly exposed through the same master, to provide a plurality of stencil designs on the film. Accordingly, means is provided for moving the film support 24 to accurately determined positions after each exposure. A plurality of identical, precisely dimensioned gauge blocks 40 are positioned in a row between stop 23 and block 20. After each exposure, the cover 26 is opened and a single block 40 is removed. The film support is then moved toward stop 23, the intervening remaining blocks 40 determining the new position of the film for the next exposure. The individual gauge blocks are dimensioned in accordance with the size of the master and the desired spacing between the stencil designs on the film. It is understood that the blocks 40 number one less than the maximum number of designs which may be feasibly accommodated on the sheet film, the designs being arranged in a row.

When the desired number of exposures have been completed, the exposed sheet film is removed from its support, washed to remove the portions of gelatin coating 15 which were masked by the design on master 10, leaving the exposed portions of the gelatin coating supported on the film. The wet gelatin surface is then pressed against the silk screen, not shown and the film 14 is peeled away after the gelatin has dried in place, thus leaving the completed stencil in place on the screen.

In multicolor work, the other masters corresponding to the respective colors, are separately mounted on glasses 11, as previously described. The original mounted master is removed from frame 33 and is replaced with another mounted master, a new sheet of film is sensitized and secured to the film support 24, as previously described and the successive exposure procedure in contact frame 13 is repeated, using the same gauge blocks 40 and successively removing them in order to reposition the film support in the identical manner as described for the exposure of the first sheet film. In this manner, each of the exposed films may be used in the silk screen process with assurance that the individual designs of the several sheets will form accurately registering prints.

It is understood that movement may be imparted to the film support 24 by means other than that disclosed, providing such movement is accurately determined. Thus pins or gears may be used to determine the movement of the support. The film 14 may also be fed to its successive exposure positions by means of friction wheels, sprockets or by means of a revolving drum.

Alternatively, relative movement between the supported film and the mounted master may be attained by fixing the film support and causing the master to move to bring the same over accurately determined different film areas for successive exposure.

When relatively small masters are used, those portions of the glass 11 not covered by the master, may be masked. Also, in the case of small masters, the glass 11 may be shifted in the frame 33 in a manner to increase the total number of designs exposed on a single sheet of film 14.

The contact frame 13 lends itself to automatic operation whereby multiple exposures of sensitized film may be attained in a simple manner. Thus, the necessary movements may be obtained by controlled motor operation, eliminating the need for intermittently opening the cover of the frame. In such case, a roll of continuous, pre-sensitized film may be used in the contact frame.

It will thus be seen that there is provided a method and means for exposing photographic film, in which the several objects of the invention are achieved and which is well adapted to meet the conditions of practical use.

As various possible embodiments might be made of the above described invention, and as various changes might be made in the embodiment set forth, it is understood that all matter herein set forth or shown in the accompanying drawings, is to be interpreted as illustrative and not in a limiting sense.

Having thus described our invention, we claim as new and desire to protect by Letters Patent:

1. A contact frame for exposing sensitized film comprising a base, a film support mounted on said base for movement parallel thereto and comprising a flat upper surface adapted to have a sheet of sensitized film detachably secured thereto, a cover on said base enclosing said support and providing a space therebetween to permit the movement of the support relative to the base, said cover being formed with an opening, negative holding means mounted in said opening for movement toward said support to bring a negative on the holding means into contact with the film on the support and for movement away from said support to separate the negative from the film means on said cover for restraining said negative holder against transverse movement, and means for accurately locating said support in predetermined positions along said base whereby to bring predetermined areas of the film on said support into accurate registration with the negative on said holding means.

2. A contact frame as in claim 1 and further including means engageable with said negative holding means for resiliently urging said holding means toward the upper surface of said support.

3. A contact frame as in claim 2 and further including a sheet of resilient material secured to the upper surface of said support for resiliently supporting the sheet of film.

ALBERT PLEYDELL.
ROSE PLEYDELL.
JEAN F. McINTYRE.

References Cited in the file of this patent

UNITED STATES PATENTS

| Number | Name | Date |
|---|---|---|
| 1,259,355 | Bunnell | Mar. 12, 1918 |
| 1,736,914 | Huebner | Nov. 26, 1929 |
| 2,099,364 | Hunter | Nov. 16, 1937 |
| 2,200,365 | Nickelsberg | May 14, 1940 |
| 2,290,292 | Neu | July 21, 1942 |